Feb. 14, 1961 T. J. BRIDGES ET AL 2,972,081

LOW NOISE AMPLIFIER

Filed June 20, 1957 2 Sheets-Sheet 1

INVENTORS T. J. BRIDGES
R. KOMPFNER
BY David P. Kelley
ATTORNEY

INVENTORS T. J. BRIDGES
R. KOMPFNER
BY David P. Kelley
ATTORNEY

United States Patent Office 2,972,081

Patented Feb. 14, 1961

2,972,081

LOW NOISE AMPLIFIER

Thomas J. Bridges and Rudolf Kompfner, Far Hills, N.J., assignors to Bell Telephone Laboratories, Incorporated, New York, N.Y., a corporation of New York Filed June 20, 1957, Ser. No. 666,812

16 Claims. (Cl. 315—5.43)

This invention relates to electron discharge devices and, more particularly, to velocity modulation amplifier devices operating on the principle of parametric amplification.

In copending applications of H. Suhl, Serial No. 640,-465, filed February 15, 1957, and Serial No. 640,464, filed February 15, 1957, now abandoned, there is disclosed an amplifying device which operates on the principle of variation of the value of a parameter in a circuit mesh to achieve amplification of an applied signal. In that application it is shown that if, for example, the capacitance in a resonant circuit, resonant at a frequency $f_0$, is varied at a frequency rate $2f_0$, there is presented to the remainder of the system a frequency-dependent negative resistance whose largest negative value occurs for the frequency $f_0$. If the negative resistance is held to a value slightly less than the sum of the positive resistances in the remainder of the circuit, the circuit is stable and will not oscillate. However, the value of the negative resistance may be adjusted to make the net positive resistance as small as desired, and, when a signal at a frequency $f_0$ is introduced into the system, the small total resistance of the system results in large signal currents flowing therethrough. By making the load one of the positive resistances of the system, a greatly amplified signal current flows therein. Such an amplifier is inherently a low noise device, and is especially useful in applications where signal amplification with a minimum of noise is desired. Throughout the remainder of the specification and claims the term "parametric amplification" is intended to mean the type of amplification described in the foregoing.

In general, electron discharge devices of the velocity modulation type amplify through the interaction of a beam of electrons with wave energy in a circuit in proximity to the beam path. The interaction between the wave energy and the beam results in an interchange of energy, producing alternating-current components of electron velocity in the beam, some of the electrons being slowed down and others speeded up, producing, in turn, bunching of the electrons in the beam. The bunched beam interacts with the wave energy in the circuit, or induces wave energy in another circuit to give an amplified signal which is then extracted for utilization.

One well-known type of velocity modulation device utilizes a resonant cavity into which is introduced the signal to be amplified. An electron beam is passed through the cavity and is velocity modulated through interaction with the electric field in a narrow gap in the cavity. The beam, after emergence from the cavity, passes through a drift region where the velocity modulation is converted to density modulation, and then passes through a gap in a second cavity, giving up its energy thereto. The signal extracted from the second cavity is a greatly amplified version of the signal introduced into the first cavity. Such a device gives high gain at exceedingly high frequencies, and is, accordingly, quite useful in microwave applications.

Velocity modulation devices as just described are inherently quite noisy, and much effort has been directed to reducing the noise characteristics without sacrificing the advantages of high gain and high frequency operation which characterize these devices.

It is, accordingly, an object of this invention to achieve high signal amplification in a velocity modulation type device with a minimum of noise in the amplified signal.

It is another object of this invention to achieve low noise amplification in a velocity modulation device through utilization of the principle of parametric amplification.

In one illustrative embodiment of this invention, an electron discharge device comprises an evacuated envelope having therein first and second hollow cavity resonators separated by a drift space, an electron gun and a collector electrode for forming and directing an electron beam through the cavity resonators, a signal input means to the first cavity and signal input and output means to the second of said cavities.

In other illustrative embodiments of this invention, the first cavity is replaced by a slow wave circuit, such as a helix having a signal input thereto and which is terminated to be substantially reflectionless.

In accordance with one feature of this invention, the first cavity is resonant at and has introduced therein through the signal input means wave energy at a frequency $2f_0$. The electron beam, in passing through a narrow gap in the cavity is velocity modulated at a frequency $2f_0$. After emergence from the first cavity, the modulated beam passes through a drift region where it becomes density modulated, and then passes through the second cavity. The second cavity is made resonant at, and has introduced therein, through the signal input means, a signal of frequency $f_0$, which is the signal to be amplified. The electron beam, density modulated at a frequency $2f_0$, in passing through the interaction gap in the second cavity varies the inductance of the cavity at a frequency rate $2f_0$. Inasmuch as a cavity resonator is, in effect, a resonant circuit, this variation of the inductance of the cavity at a rate $2f_0$ is equivalent to varying one of the parameters of a resonant circuit at a rate $2f_0$, the prerequisite condition for parametric amplification.

In accordance with another feature of the invention, the second cavity is provided with a second gap spaced from the first gap by a drift tube. The spacing of the second gap from the first is such that the interaction between the voltage at frequency $f_0$ and the beam in the first gap induces a current at the second gap of a frequency $f_0$ which is in phase quadrature with the voltage at the second gap. This results in effectively shunting the cavity with a reactance which varies at a frequency $2f_0$. In addition, this spacing of the two gaps is such that the varying reactance is inductive and the deleterious effects of the resistive loading resulting from passage of the beam through each gap, as well as noise fluctuations on the beam at frequency $f_0$, are effectively eliminated.

The invention and the above-noted and other features will be understood more clearly and fully from the following detailed description taken in conjunction with the accompanying drawings, in which.

Figure 1:
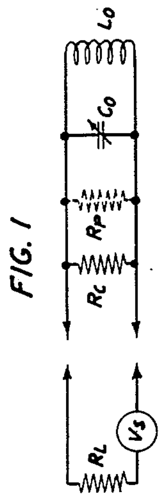
Fig. 1 is a circuit diagram for illustrating the principles of parametric amplification.

Turning now to Fig. 1, there is shown, for the purpose of explaining the parametric amplification phenomenon, a resonant circuit comprising an inductance $L_o$, a capacitance $C_o$, and a resistance $R_o$ which is made up of the load resistance $R_L$ and the circuit resistance $R_c$ connected in parallel. The parameters $L_0$, $C_0$ and $R_0$ are such that the circuit resonates at a frequency $f_0$. The circuit of Fig. 1 is shown as having common input and output connections, which consist of a transmission line of characteristic impedance $R_L$ fed from a matched generator of open circuit voltage $V_S$.

The voltage across $C_0$ has the value $$V=V_0 \sin \omega t \qquad (1)$$

where $\omega$ equals $2\pi f_0$, is applied to the circuit through a signal input.

If the capacitance is varied such that $$C=C_0[1+\epsilon \sin (2\omega t+\varphi)] \qquad (2)$$

where $\epsilon$ is the ratio of the maximum change $\Delta C$ of C to $C_0$, and $\varphi$ is phase angle, then for the capacitance $$q=CV \qquad (3)$$

where $q$ is the charge on the capacitance, and the current through the capacitance is $$I=\frac{dq}{dt}=C\frac{dV}{dt}+V\frac{dC}{dt} \qquad (4)$$

from which $$I=\omega V_0 C_0\left[\cos \omega t + \epsilon \sin (3\omega t+\varphi)-\frac{\epsilon}{2}\sin(\omega t+\varphi)+\frac{\epsilon}{2}\sin(3\omega t+\varphi)\right] \qquad (5)$$

Eliminating the harmonic terms, the instantaneous power in the capacitance is given by $$P_i=IV=V_0\sin \omega t\left\{\omega V_0 C_0\left[\cos \omega t-\frac{\epsilon}{2}\sin(\omega t+\varphi)\right]\right\}$$
$$=\omega V_0^2 C_0\left[\frac{1}{2}\sin 2\omega t-\frac{\epsilon}{4}\cos\varphi-\frac{\epsilon}{4}\cos(2\omega t+\varphi)\right] \qquad (6)$$

The average power in the capacitance is given by $$P_{ave}=\frac{1}{2\pi}\int_0^{2\pi} IVd\omega t \qquad (7)$$

Combining Equations 6 and 7

$$P_{ave}=-\omega V_0^2 C_0 \frac{\epsilon}{4}\cos\varphi \qquad (8)$$

It can be seen from Equation 8 that the average power is given by a negative term, hence it can be considered as being absorbed by a negative resistance $R_p$ shunting the capacitance $C_0$ as shown in dotted lines in Fig. 1, in which case $$\frac{V_0^2}{2R_p}=-\omega V_0^2 C_0\frac{\epsilon}{4}\cos\varphi \qquad (9)$$

and $$R_p=-\frac{2}{\omega C_0 \epsilon}\cos\varphi \qquad (10)$$

Oscillations will occur in the circuit of Fig. 1 when $R_p$ is equal to $R_0$, which condition is best met when $\cos\varphi$ equals unity, in which case $$\epsilon=\frac{2}{\omega C_0 R_0}=\frac{2}{Q} \qquad (11)$$

In computing gain, consider the circuit of Fig. 1 as it is when just below the oscillation point. From transmission line theory, it is known that the voltage gain in the circuit is equal to the reflection coefficient $\Gamma$, thus $$V_g=\Gamma=\frac{R_{termination}-R_{line}}{R_{termination}+R_{line}} \qquad (12)$$

$$=\frac{\frac{1}{R_{line}}-\frac{1}{R_{termination}}}{\frac{1}{R_{line}}+\frac{1}{R_{termination}}} \qquad (13)$$

but $R_{line}=R_L$ and $$\frac{1}{R_{termination}}=\frac{1}{R_c}+\frac{1}{R_p}$$

therefore $$V_g=\frac{\frac{1}{R_L}-\frac{1}{R_c}-\frac{1}{R_p}}{\frac{1}{R_L}+\frac{1}{R_c}+\frac{1}{R_p}} \qquad (14)$$

Consider the Q of the circuit prior to introduction of the reactance variation

Then $$\frac{1}{Q}=\frac{1}{\omega C_0 R_0}=\frac{1}{\omega C_0}\left(\frac{1}{R_L}+\frac{1}{R_c}\right) \qquad (15)$$

From Equation 10

$$\frac{1}{R_p}=-\frac{\omega C_0 \epsilon}{2} \qquad (16)$$

therefore $$V_g=\frac{\frac{1}{R_L}-\frac{1}{R_c}+\frac{\omega C_0\epsilon}{2}}{\frac{\omega C_0}{Q}-\frac{\omega C_0 \epsilon}{2}} \qquad (17)$$

$$=\frac{\frac{1}{R_L}-\frac{1}{R_c}+\frac{\omega C_0\epsilon}{2}}{\omega C_0\left(\frac{1}{Q}-\frac{\epsilon}{2}\right)} \qquad (18)$$

From Equation 18 it can be seen that if $\epsilon$ is given a value just slightly less than the value given in Equation 11 (the condition for oscillation) the circuit of Fig. 1 is stable and capable of high gain amplification.

Figure 2:
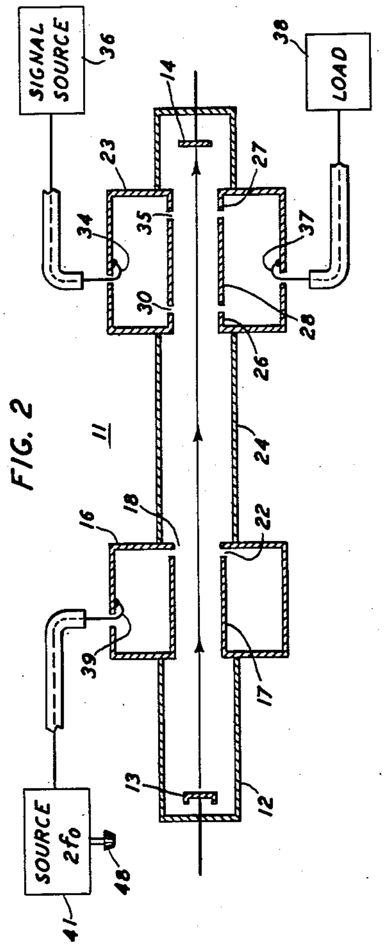
Fig. 2 is a schematic view of one preferred embodiment of the present invention.

In Fig. 2 there is shown schematically a velocity modution type device 11 embodying the principles of the present invention. Located at opposite ends of an evacuated elongated envelope 12 which, for example, is of glass or any suitable material, are a source 13 of a beam of electrons and a target or collector electrode 14. The electron source 13 is shown schematically and will, in general, comprise an electron emissive cathode, a heater unit, an intensity control element, and an electrode arrangement for shaping and accelerating the electron beam which have been omitted for the sake of simplicity. The target 14 serves as a collector of electrons and is accordingly maintained at a suitable potential positive with respect to the electron emissive cathode of source 13 by means of suitable lead-in connections from a voltage source, not here shown. In general such a device is provided with a magnetic assembly or other suitable means not here shown for focusing the electron beam throughout its travel along the path from the cathode 13 to the collector 14. Located intermediate the ends of the elongated envelope 12 is a cavity resonator 16 which is preferably of highly conductive material. The resonator 16 may, as shown in Fig. 2, be incorporated into the elongated envelope 12 as a part thereof or it may be mounted externally of the envelope in a manner well known in the art. Resonator 16 is provided with a hollow reentrant portion 17 which is open at both ends and axially aligned with the electron beam. Opposite the interior end of the reentrant portion 17 is an aperture 18 in the wall of the cavity resonator which is axially aligned with the reentrant portion and with the electron beam so that the beam may pass completely through the cavity resonator. Aperture 18 and the interior end of reentrant portion 17 are in close proximity to each other, thereby defining a gap 22 across which the electron beam passes. Downstream of the first cavity, that is to say at a point along the axis of the beam more remote from the electron gun than cavity 16 is a second resonant cavity 23 which, like cavity 16, may form a part of the evacuated envelope 12 or which may be mounted externally thereof. Cavity 23 is separated from cavity 16 by a portion 24 of the evacuated envelope 12 which defines a drift space, the function of which will be explained more fully hereinafter. Cavity 23 is provided with a first hollow reentrant portion 26 open at both ends and a second hollow reentrant portion 27 open at both ends. Between the interior ends of the two reentrant portions is located a hollow metallic member 28 defining a drift space. The interior end of reentrant portion 26 and the end of the member 28 are in close proximity to each other, thereby defining a narrow gap 30 past which the electron beam is projected. The interior end of reentrant portion 27 and the end of member 28 adjacent thereto are likewise in close proximity, defining a narrow gap 35 past which the electron beam is projected. It is to be understood that while the cavities 16 and 23 have here been shown as comprising reentrant portions for defining a narrow gap, other suitable geometric configurations might be used, and the arrangement here shown is intended merely to be by way of illustration.

Cavity 23 has supplied thereto through an input coupling means 34 a signal, centered about a frequency $f_o$, to be amplified. Coupling means 34 is connected to a signal source 36 through a coaxial line or any other suitable high frequency transmission line. Cavity 23 is likewise provided with an output coupling member 37 which extracts the amplified signal from the cavity and applies it to a load 38 through a suitable transmission line.

In order for the device 11 to amplify signals in accordance with the principles of parametric amplification it is necessary to vary one of the parameters of the resonant cavity 23 in such a way that gain will be realized in the manner set forth in connection with the discussion of Fig. 1. To this end cavity 16 is supplied through an input member 39 with wave energy having, for example, a frequency $2f_o$, from a source 41, which is connected to input 39 through suitable transmission means.

In operation, an electron beam is projected past the gap 22 in cavity 16 where it interacts with wave energy from the source 41. Such interaction produces a velocity modulation, at a frequency $2f_o$, of the electron beam in a manner well known in the art. After emergence from the cavity 16 the velocity modulated beam passes through the drift tube 24 wherein the velocity modulations are converted to density modulations. Drift tube 24 is of such a length that the beam enters the gap 30 in cavity 23 at a time when its velocity modulation has been substantially completely converted into density or current modulation. As the beam passes through gap 30 it is velocity modulated by the voltage in the gap resulting from the presence of the signal from the source 36. As the beam passes through the drift tube 28 the velocity modulations from gap 30 become density modulations and as the beam passes through gap 35 the density modulations induce a current in gap 35 in accordance with the velocity modulation which was introduced onto the beam by the voltage at gap 30. It can be seen, therefore, that a voltage at gap 30 produces a current at gap 35, and the ratio of this voltage to the current can be regarded as an impedance which is shunted across the cavity 23, the impedance being varied at a rate $2f_o$, which, as pointed out in the foregoing, is a condition which produces parametric amplification.

Figure 3:
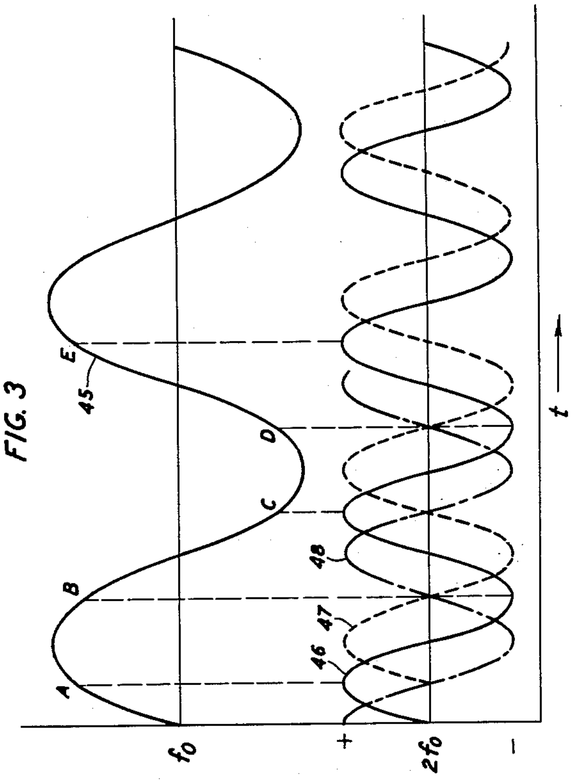
Fig. 3 is a diagram for illustrating certain principles upon which the present invention is based.

For a better understanding of how the impedance varies at a rate $2f_o$, recourse is had to Fig. 3. Fig. 3 depicts the relationship of the fields resulting from the signal voltage in the gap 30 to the electron bunches on the beam. The curve 45 represents the voltage in the gap 30 at the signal frequency $f_o$, while curve 46 represents the electron beam, bunched at a frequency $2f_o$. The positive peaks of the curve 46 represent regions in the beam of high electron density, i.e., bunches, while the negative peaks represent regions of low electron density, i.e., no bunches. It can be seen from Fig. 3 that when the field in the gap 30 is as depicted at A on curve 45, the voltage in the gap interacts with a high density portion of the beam to produce a velocity modulation thereof. This velocity modulated portion of the beam, after passage through the drift tube 28, induces a strong current at the gap 35. By proper choice of the length of the drift tube 28, this current is made to be aproximately 90° out of phase with the voltage at gap 35, which voltage bears a fixed relationship to the phase and amplitude of the voltage at gap 30, thereby effectively shunting the cavity 23 with a pure reactance. When the voltage in the gap 30 is as depicted at B on curve 45, it reacts with a portion of the beam of very low density, thereby having little effect on the beam. When this portion of the beam passes the gap 35, very little current is induced, and the effective shunting impedance is greatly reduced. When the voltage in the gap 30 is as depicted at C on curve 45, it interacts with a high density portion of the beam which, in turn, induces a large current at the gap 35. Inasmuch as the voltage in gap 30 and the current in gap 35 are equal in magnitude and opposite in direction to what they were at point A, there is again a maximum reactance shunting the cavity, the reversals in direction of both voltage and current, however, producing no change in sign of the reactance. At point D there is again, as was the case at point B, a very small reactance and at point E, as at points A and C, a large reactance. It can be seen, therefore, that when the voltage at the gap 30 has a frequency $f_o$, and the beam is density modulated at a frequency $2f_o$, cavity 23 is shunted by a reactance which varies between maxima and minima at a rate $2f_o$, which, as explained in the foregoing, is a prerequisite condition for parametric amplification.

For maximum amplification, it is necessary that a portion of the beam having maximum density appears in the gap 30 at a time when the voltage in the gap is a maximum. This phase relationship is depicted by the curve 47 in Fig. 3. In addition, the phase relationship which produces the least variation in shunting reactance, hence the least amplification, is depicted by the curve 48 in Fig. 3. In order that the proper phase relationship be achieved, the source 41 of frequency $2f_o$ is shown with an adjustable member 48 which varies the phase of the voltage fed to the cavity 16. By properly metering the signal output to the load 38, maximum output can be achieved by adjusting knob 48 until a maximum meter reading is obtained, at which point the phase relationship depicted by curve 47 of Fig. 3 prevails.

From the foregoing it is readily apparent that the length of the drift tube 28 determines the type of reactance shunting the cavity 23. If the distance between the center of gaps 30 and 35 is made such that the drift time corresponds to $n+\frac{1}{2}$ cycles at a frequency $f_o$ where $n$ is any integer, the shunting reactance is a pure positive (inductive) reactance, whereas it will be a pure negative (capacitive) reactance if the drift time is $n+1$ cycles. However, any current modulation, such as noise in the beam at a frequency $f_o$ will be in antiphase at the two gaps 30 and 35 if the transit time is made $n+\frac{1}{2}$ cycles, whereas it will be in phase if the transit time is $n+1$ cycles. When the currents are in antiphase, there is substantially complete elimination of noise at a frequency $f_o$ in the output of cavity 23 whereas there is a large amount of noise in the signal output when the noise currents in the two gaps are in phase. For this reason, drift tube 28 is preferably of a length to give a pure inductive reactance shunting the cavity 23, the length between gap centers being $n+\frac{1}{2}$ cycles at frequency $f_0$.

In addition to the elimination of noise in the output signal, the effects of beam loading resulting from the beam passing through a gap of finite width are substantially reduced inasmuch as the currents in the two gaps are in antiphase and tend to cancel.

In both the elimination of noise and the reduction in beam loading effect, there will be something less than complete elimination for frequencies other than $f_0$. However, there will still be substantially more noise reduction than was heretofore considered obtainable in a velocity modulation type device.

Figure 4:
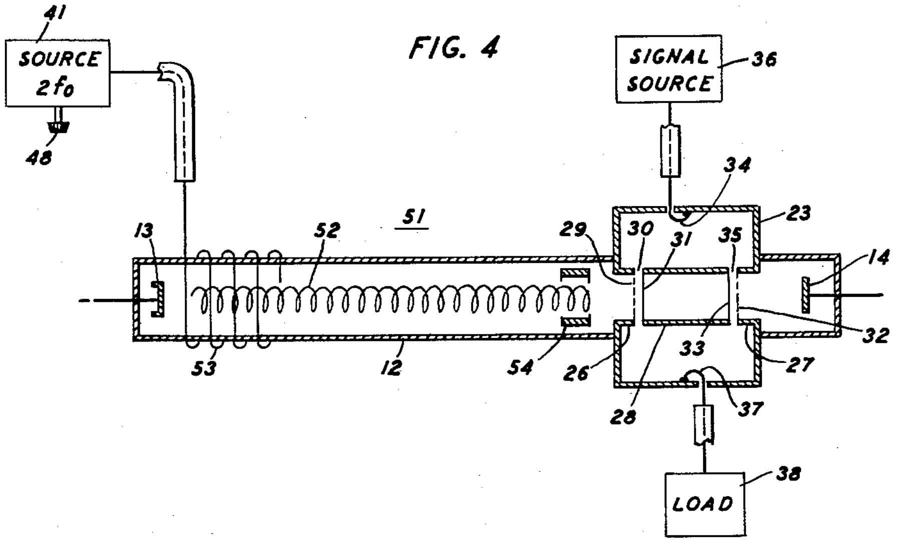
Fig. 4 is a schematic view of a second preferred embodiment of the invention.

In the device of Fig. 2, the beam is first modulated by being passed through a resonant cavity 16 having therein wave energy at a frequency preferably twice the frequency of the signal to be amplified. After emergence from cavity 16, the beam passes through a drift tube 24 where it becomes density modulated. As was pointed out before, the drift tube 24 is preferably of such a length that the beam is substantially completely density modulated when it reaches the gap 30 in cavity 23. As a result, the length of drift tube 24 is rather critical. In addition, cavities 16 and 23 are resonant at frequencies $2f_0$ and $f_0$ respectively, both being inherently narrow band devices, and, therefore, a careful matching of the cavities is necessary. In Fig. 4 there is shown a second preferred embodiment of the invention wherein the necessity for carefully determining the drift tube proportions and for matching the cavities is obviated. For simplicity, the elements in the arrangement of Fig. 4 which are the same as those of Fig. 1 are given the same identification numerals.

The device 51 of Fig. 4 comprises an elongated evacuated envelope 12 having a resonant cavity 23 forming a part thereof, and an electron gun 13 and collector electrode 14 for forming and projecting an electron beam past gaps 30 and 35 in cavity 23. As was pointed out in the foregoing, for parametric amplification it is necessary to modulate the beam at a frequency greater than the signal frequency to be amplified. To this end, there is disposed within envelope 12 between gun 13 and cavity 23 an elongated conducting helix 52 for propagating an electromagnetic wave in interacting relationship with the beam in a manner well known in the art. A beam modulating signal is applied to helix 52 from a source 41 through a suitable transmission line and input coupling helix 53. It is to be understood that while a helix 53 is shown as the input coupling any one of a number of suitable means well known in the art for launching a wave on helix 52 may be used, the arrangement here shown being by way of example only. After a wave has been launched on helix 52, it propagates therealong and interacts with the beam to produce density modulations thereon in a manner well known in the art. The downstream end of helix 52, that is, the end of helix 52 more remote from gun 13, is terminated by a suitable resistive termination so as to be substantially reflectionless.

In an article entitled "Coupled Mode Description of the Backward Wave Oscillator and the Kompfner Dip Condition" by R. W. Gould, in I.R.E. Transactions on Electron Devices, vol. ED–2, Number 4, October 1955, on page 40 there is a discussion of the "Kompfner Dip Condition," which is the point of operation in a traveling wave tube where there is no radio frequency output, all of the energy being in the form of beam modulation. In the case of the device of Fig. 4, where forward wave interaction is utilized, the length of helix 52 may be chosen, if desired, to produce the Kompfner Dip Condition, hence substantially all of the radio frequency energy is converted to beam energy. The beam modulation arrangement of the tube 51 of Fig. 4, being an inherently broad band arrangement, eliminates the necessity for carefully matching resonant devices, the only critical structure being the cavity 23.

Figure 5:
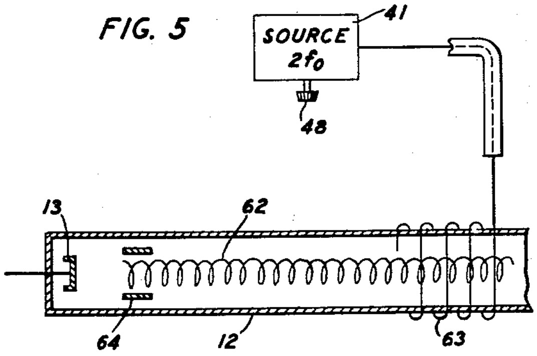
Fig. 5 is a schematic view of a portion of another preferred embodiment of the invention.

The device of Fig. 4 possesses the virtue of broad band operation, and, inasmuch as a pure fast mode is utilized, as is pointed out in the aforementioned Gould article, the bunches on the beam do not disintegrate with distance, thus permitting wide latitude in the positioning of cavity 23. However, large amounts of power are necessary to properly modulate the beam. In Fig. 5 there is shown a beam modulating arrangement which requires only small amounts of power while retaining the broad band characteristic of the arrangement of Fig. 4. For simplicity, only the beam modulating portion of the device has been shown, the remaining parts being identical to and functioning in the same manner as corresponding elements in the embodiments of Figs. 2 and 4. In the device of Fig. 5, wave energy from source 41 is launched on a wave propagation circuit 62 through a suitable input coupling number 63, at the downstream end thereof, and propagates in a direction opposite to the electron flow toward the upstream end of circuit 62. The upstream end of circuit 62 is terminated to be substantially reflectionless by a suitable resistive termination 64. Such an arrangement produces interaction between the electron beam and a backward traveling component of the wave on circuit 62, in a manner well known in the art. Circuit 62 is preferably of a type which gives enhanced backward wave interaction, such as those shown in a copending application of C. F. Quate and R. Kompfner, Serial No. 609,483, filed September 12, 1956, now United States Patent 2,955,223, issued October 4, 1960, or it may take any one of a number of forms well known in the art. By proper choice of the length of circuit 62, a condition equivalent to the Kompfner Dip Condition obtains, and a substantially pure slow mode is excited. When this condition obtains, energy is extracted from the beam to produce bunching thereof, in contradistinction to the arrangement of Fig. 4, where energy was fed to the beam to bunch it. As a result, exceedingly small amounts of radio frequency power applied at the input produce the same degree of beam modulation as large amounts of power fed to the input produce in the device of Fig. 4.

It is to be understood that the foregoing embodiments utilizing the principles of the invention are by way of illustrating those principles, and that other different embodiments will be apparent to those skilled in the art without departing from the spirit and scope of the invention.

For example, certain of the interaction circuits have been depicted as resonant cavities, whereas it is possible that other types of circuits which afford interaction between wave energy and an electron beam would lend themselves equally well to parametric amplification as taught in the foregoing.

What is claimed is:

1. In an electron discharge device, means including an electron gun for forming and projecting an electron beam along a path, means positioned adjacent at least a portion of said path for maintaining signal wave energy in interacting relationship with said beam, means for applying to said means adjacent said path a signal to be amplified, means for varying the reactance of said means adjacent said path at a frequency rate greater than the frequency of said signal, said means for varying the reactance including means for modulating said beam at said greater frequency rate, and means for extracting the amplified signal directly from said means adjacent said path.

2. In an electron discharge device, means including an electron gun for forming and projecting an electron beam along a path, circuit means positioned along said path in interacting relationship therewith, means for applying to said circuit means a signal to be amplified, means for varying the reactance of said circuit which varies at a frequency rate greater than the frequency of said signal, said means for varying the reactance including means for modulating said beam at said greater frequency rate, and means for extracting the amplified signal directly from said first mentioned circuit means.

3. In an electron discharge device, means including an electron gun for forming and projecting an electron beam along a path, circuit means positioned along said path in interacting relationship therewith, means for applying to said circuit means a signal to be amplified, means for varying the reactance of said circuit at a frequency rate greater than the frequency of said signal, said means for varying the reactance including circuit means between said first mentioned circuit means and said gun in interacting relationship with said beam for modulating said beam at said greater frequency rate, means for applying wave energy at said greater frequency rate to said second mentioned means, and means for extracting the amplified signal from said first mentioned circuit means.

4. In an electron discharge device, means including an electron gun for forming and projecting an electron beam along a path, circuit means positioned along said path in interacting relationship therewith, means for applying to said circuit means a signal to be amplified, means for varying the reactance of said circuit at twice the frequency rate of said signal, said means for varying the reactance including a resonant circuit resonant at twice the frequency of said signal and positioned between said first mentioned circuit means and said gun in interacting relationship with said beam for modulating said beam at the greater frequency rate, means for applying wave energy at said greater frequency rate to said resonant circuit, and means for extracting the amplified signal from said first mentioned circuit means.

5. In an electron discharge device, the combination as claimed in claim 4 and in further combination with an elongated drift space separating said first circuit and said second circuit.

6. In an electron discharge device, means including an electron gun for forming and projecting an electron beam along a path, circuit means positioned along said path in interacting relationship therewith, means for applying to said circuit means a signal to be amplified, means for varying the reactance of said circuit at twice the frequency rate of said signal, said means for varying the reactance including an elongated wave propagating circuit between said first mentioned circuit means and said gun in interacting relationship with said beam for modulating said beam at said greater frequency rate, means for launching wave energy at said greater frequency rate onto said wave propagating circuit at one end thereof, means terminating the other end of said wave propagation circuit in a substantially reflectionless termination, and means for extracting the amplified signal from said first mentioned circuit means.

7. In an electron discharge device, the combination as claimed in claim 6 wherein the means for launching wave energy on said wave propagation circuit is located at the upstream end of said circuit and the terminating means is located at the downstream end thereof.

8. In an electron discharge device, the combination as claimed in claim 6 wherein the means for launching the wave on said wave propagating circuit is located at the downstream end of said circuit and the terminating means is located at the upstream end thereof.

9. In an electron discharge device, means including an electron gun and a collector electrode for forming and projecting an electron beam along a path, a resonant circuit positioned along said path in interacting relationship with said beam, a source of signals to be amplified, means for applying to said resonant circuit signals from said source, means for varying the reactance of said resonant circuit at a frequency rate greater than the frequency of said signal, said varying means including circuit means between said resonant circuit and said gun in interacting relationship with said beam for modulating said beam at said greater frequency rate, means for applying wave energy at said greater frequency rate to said second circuit, and means for extracting the amplified signal from said resonant circuit.

10. In an electron discharge device, means including an electron gun and a collector electrode for forming and projecting an electron beam along a path, a resonant cavity positioned along said path, said cavity having a narrow gap therein past which said beam passes in interacting relationship with said gap, a source of signals to be amplified, means for applying to said resonant cavity signals from said source, means for varying the reactance of said resonant cavity at a frequency rate greater than the frequency of said signal, said varying means including circuit means between said resonant circuit and said gun in interacting relationship with said beam for modulating said beam at said greater frequency rate, means for applying wave energy at said greater frequency rate to said second circuit, and means for extracting the amplified signal from said resonant circuit.

11. In an electron discharge device, means including an electron gun and a collector electrode for forming and projecting an electron beam along a path, a resonant cavity positioned along said path, said cavity having a first gap therein past which said beam passes in interacting relationship with said gap, and a second gap therein spaced from said first gap past which said beam passes in interacting relationship subsequent to its passage past said first mentioned gap, a source of signals to be amplified, means for applying to said resonant cavity signals from said source, means for varying the reactance of said resonant cavity at a frequency rate greater than the frequency of said signal, said varying means including circuit means between said resonant cavity and said gun in interacting relationship with said beam for modulating said beam at said greater frequency rate, means for applying wave energy at said greater frequency rate to said second circuit, and means for extracting the amplified signal from said resonant circuit.

12. In an electron discharge device, the combination as claimed in claim 11 wherein said first mentioned gap and said second mentioned gap are separated by a drift region through which said beam passes.

13. In an electron discharge device, means including an electron gun and a collector electrode for forming and projecting an electron beam along a path, a resonant cavity positioned along said path, said cavity having a first gap therein past which said beam passes in interacting relationship with said gap, and a second gap therein spaced from said first gap by a drift region and past which said beam passes in interacting relationship subsequent to its passage past said first mentioned gap, a source of signals to be amplified, said second mentioned gap being spaced from said first mentioned gap by a distance equal to $n+½$ cycles, wherein $n$ is an integer, at the mean frequency of the signals to be amplified, means for applying to said resonant cavity signals from said source, means for varying the reactance of said resonant cavity at a frequency rate greater than the frequency of said signal, said varying means including circuit means between said resonant cavity and said gun in interacting relationship with said beam for modulating said beam at said greater frequency rate, means for applying wave energy at said greater frequency rate to said second circuit, and means for extracting the amplified signal from said resonant circuit.

14. In an electron discharge device, a combination as claimed in claim 13 wherein said circuit means comprises a resonant cavity resonant at twice the mean frequency of the signals to be amplified and through which said beam passes.

15. In an electron discharge device, the combination as claimed in claim 13 wherein said circuit means is an elongated, slow wave circuit having the means for applying wave energy thereto coupled to its upstream end and being terminated in a substantially reflectionless termination at its downstream end.

16. In an electron discharge device, the combination as claimed in claim 13 wherein said circuit means comprises a slow wave circuit having the means for applying wave energy thereto coupled to its downstream end and being terminated by a substantially reflectionless termination at its upstream end.

References Cited in the file of this patent

UNITED STATES PATENTS

| | | |
|---|---|---|
| 2,455,269 | Pierce | Nov. 30, 1948 |
| 2,579,480 | Feenberg | Dec. 25, 1951 |
| 2,595,698 | Peter | May 6, 1952 |
| 2,681,951 | Warnecke et al. | June 22, 1954 |
| 2,767,259 | Peter | Oct. 16, 1956 |
| 2,794,936 | Huber | June 4, 1957 |
| 2,879,439 | Townes | Mar. 24, 1959 |

OTHER REFERENCES

Barrow et al.: "A Further Study of Oscillatory Circuits Having Periodically Vary Parameters," Journal of Franklin Institute, vol. 221, pages 403–416, March 1936.

Suhl: "A Proposal For a Ferromagnetic Amplifier in the Microwave Range," Physical Review, vol. 106, pages 384–385, April 1957.